(12) United States Patent
Allan (10) Patent No.: US 6,251,179 B1
(45) Date of Patent: Jun. 26, 2001

(54) THERMALLY CONDUCTIVE CEMENTITIOUS GROUT FOR GEOTHERMAL HEAT PUMP SYSTEMS

(75) Inventor: Marita Allan, Old Field, NY (US)

(73) Assignee: The United States of America as represented by the Department of Energy, Washington, DC (US)

( * ) Notice: Subject to any disclaimer, the term of this patent is extended or adjusted under 35 U.S.C. 154(b) by 0 days.

(21) Appl. No.: 09/274,531

(22) Filed: Mar. 23, 1999

(51) Int. Cl.$^7$ .......................... C04B 14/06; C04B 14/10; C04B 24/20; E21B 33/14
(52) U.S. Cl. .......................... 106/719; 106/718; 106/721; 106/724; 106/725; 106/726; 106/803; 106/809; 106/811; 106/812; 166/293; 166/302; 507/103; 507/135; 507/140
(58) Field of Search .......................... 106/714, 725, 106/726, 809, 718, 719, 721, 724, 803, 811, 812; 166/293, 302; 507/103, 135, 140

(56) References Cited

U.S. PATENT DOCUMENTS

| 4,556,109 | 12/1985 | Eilers | 166/295 |
|---|---|---|---|
| 4,861,378 | 8/1989 | Watanabe et al. | 106/774 |
| 4,912,941 | 4/1990 | Büchi | 62/260 |
| 4,993,483 | 2/1991 | Harris | 165/45 |
| 5,038,580 | 8/1991 | Hart | 62/324.6 |
| 5,114,487 | * 5/1992 | Gartshore et al. | 106/695 |
| 5,512,096 | 4/1996 | Krause | 106/718 |
| 5,536,310 | * 7/1996 | Brook et al. | 106/708 |
| 5,590,715 | 1/1997 | Amerman | 166/290 |
| 5,706,888 | 1/1998 | Ambs et al. | 165/155 |
| 5,758,724 | 6/1998 | Amerman | 166/290 |
| 5,816,314 | 10/1998 | Wiggs et al. | 165/45 |

OTHER PUBLICATIONS

Dr. Marita Allan, *Cementitious Grouts for Geothermal Heat Pump Systems*, Geothermal Resources Council Transactions, 22:419–423, Apr. 1998.

M.L. Allan and A. J. Philippacxopoulos, *Thermally Conductive Cementitious Grouts for Geothermal Heat Pumps*, BNL–66103 Informal report to Office of Geothermal Technologies U.S. Department of Energy, 1–78, Nov. 1998.

* cited by examiner

Primary Examiner—Anthony Green
(74) Attorney, Agent, or Firm—Joy Alwan; Thomas G. Anderson; Paul A. Gottlieb (57) ABSTRACT

A thermally conductive cement-sand grout for use with a geothermal heat pump system. The cement sand grout contains cement, silica sand, a superplasticizer, water and optionally bentonite. The present invention also includes a method of filling boreholes used for geothermal heat pump systems with the thermally conductive cement-sand grout. The cement-sand grout has improved thermal conductivity over neat cement and bentonite grouts, which allows shallower bore holes to be used to provide an equivalent heat transfer capacity. In addition, the cement-sand grouts of the present invention also provide improved bond strengths and decreased permeabilities. The cement-sand grouts can also contain blast furnace slag, fly ash, a thermoplastic air entraining agent, latex, a shrinkage reducing admixture, calcium oxide and combinations thereof.

25 Claims, 3 Drawing Sheets

THERMALLY CONDUCTIVE CEMENTITIOUS GROUT FOR GEOTHERMAL HEAT PUMP SYSTEMS

This invention was made with U.S. government support under U.S. Department of Energy Contract No. DE-AC02-98C1110886 with Brookhaven National Laboratory. The U.S. Government has certain rights in the invention.

BACKGROUND OF INVENTION

The present invention relates to grout for use with geothermal heat pump systems. In particular, the present invention relates to cement-sand grouts having improved thermal conductivity, as well as increased bond strength and decreased permeability.

Geothermal heat pump (GHP) systems for recovering energy from the ground are well known. The temperature of the Earth increases with increasing depth, to 400–1800° F. at the base of the Earth's crust and to an estimated temperature of 6300–8100° F. at the center of the Earth. Geothermal energy is present everywhere beneath the Earth's surface, but in order to be used as a source of energy, it must be accessible to drilling and, therefore, must be relatively close to the surface. Since a major cost in geothermal development is drilling and since the cost of drilling increases with increasing depth, shallow concentration of geothermal energy are preferred. The most conspicuous use of geothermal energy is the generation of electricity by providing high temperature water that is partly flashed to steam, and this steam is used to drive conventional turbine-generators.

GHP systems can use the ground as either a heat source or a heat sink for inexpensively heating and cooling residential m'd commercial buildings or for providing heated water. In some areas (particularly regions of low elevations), high concentration of geothermal energy are relatively close to the surface and provide an economical heat source. In other areas, the temperature of the ground is fairly constant at depths only a few yards below the surface. This constant temperature allows GHP systems to use the ground as either a heat source or a heat sink. When the ambient temperature is high, the GHP system is used as a heat sink to cool the fluid passing through the piping system so that when it returns to the surface it can be used for cooling. When the ambient temperature is low, the GHP system is used as a heat source to heat the fluid passing through the piping system so that when it returns to the surface it can be used for heating.

In general, a GHP system includes a pump, a piping system buried in the ground, an above ground heat transfer device and a heat transfer fluid that is circulated through the piping system by the pump. The ground is used either as a heat source to heat the circulating fluid or as a heat sink to cool the fluid. An important factors in determining the feasibility of a GHP system is the depth of wellbore, which affects the drilling costs, the cost of the pipe and the size of the pump. If the wellbore has to be drilled to too great a depth, a GHP system may not be a practical alternative energy source. One way to minimize the depth of the wellbore is to increase the heat transfer efficiency of the system.

An important aspect of all GHP systems is the grout that is used to secure the piping system in the ground. Vertically oriented ground heat exchangers for geothermal heat pumps (GHPs) require grout to be placed between the U-loop and the surrounding formation. When the U-loop for a GHP system is installed, a hole is drilled in the ground and the pipe is lowered into place. Grout is then poured around the piping to protect the pipes from the movement of the ground and from ground water. The grout provides a heat transfer medium and acts as a sealant to prevent contamination of the water supply. The thermal conductivity of the grout has a significant impact on the required depth of the wellbore and, hence, the installation costs. The more efficient the heat transfer between the fluid in the U-loop and the ground formation, the shorter the wellbore required to provide the desired heat transfer. A grout that does not efficiently conduct heat can act as an insulator and reduce the efficiency of the GRP system.

In the past, bentonite grouts have been used for GHP systems with mixed results. Although bentonite has good sealant properties, it has a relatively low thermal conductivity. Neat cement grouts have also been used with some degree of success, but high water to cementitious materials (w/c) ratios often create pores in the grout which cause a significant decrease in thermal conductivity. In addition, neat cement grouts with high w/c ratios are prone to shrinkage and do not form a satisfactory bond with the U-loop.

When choosing a grout formulation several factors have to be considered in order to improve thermal conductivity while meeting requirements for mixing and pumping with conventional equipment, permeability, shrinkage, bonding to the U-loop, durability, ease of handling, and economics. Other factors that must be considered are shrinkage, sulphate resistance, bleeding, environmental impact and coefficient of thermal expansion.

Various attempts have been made in the prior art to overcome problems caused by uneven curing, high well temperatures and heat transfer. U.S. Pat. No. 4,556,109 to Eilers discloses a curable slurry for cementing casing tubes in a wellbore. The slurry includes crushed coal and furfuryl alcohol, furfural, and/or a low molecular weight mono- or copolymer thereof U.S. Pat. No. 4,861,378 to Watanabe et al. discloses a cement additive containing superplasticizer, bentonite and inorganic strength-improving agents selected from calcium sulfates, silica fume.

U.S. Pat. No. 4,912,941 to Buichi discloses a method of extracting thermal energy from the earth's interior and uses a heat conducting grout made of a mixture of water and cement, along with one or more of a siliceous gel and finely divided metal powder, preferably silver and/or aluminum powder. BicMi also discloses the use of a special steel, asbestos-cement or a synthetic resin for thermal insulation of a pipe. U.S. Pat. No. 4,993,483 to Harris discloses a system for conditioning air in an enclosed space by transferring heat between the air and a heat exchange liquid. Harris uses sand or silica particles packed around tubes in the ground to thermally stabilize the tubes.

U.S. Pat. No. 5,038,580 to Hart discloses a heat pump system having a direct earth coupled underground heat exchanger. Hart teaches a grout material made of either cement alone or a mixed slurry of bentonite and water. U.S. Pat. No. 5,512,096 to Krause discloses a grouting material for sealing boreholes or other cavities that includes 90–99.99% water swellable clay and 0.01–10.0% gelling agent. The swellable clay can be bentonite and the preferred gelling agent is cement.

U.S. Pat. Nos. 5,590,715 and 5,758,724 to Amerman disclose the use of a bentonite clay mixture grout with systems that simultaneously introduce a loop of heat exchange pipe and a grout pipe into a wellbore. U.S. Pat. No. 5,706,888 to Ambs et al. discloses a volcanic clay or concrete grout for a heat pump circuit which operates to either cool or heat a space by transferring heat to and from an outside heat source/sink, such as the earth. U.S. Pat. No. 5,816,314 to Wiggs et al. discloses a geothermal heat exchange unit which can be placed in the ground and backfilled with fly-ash cement, concrete or the like to eliminate air gaps and increase thermal conductivity.

The grouts used in the prior art have not been completely satisfactory and there is still a need for a grout with improved heat transfer characteristics to improve the efficiency of GHP systems.

SUMMARY OF THE INVENTION

In accordance with the present invention, a thermally conductive cement-sand grout for use with a geothermal heat pump system is provided. The cementitious grout includes cement, a silica sand, a superplasticizer and water; wherein the parts by weight of silica sand is greater than the parts by weight of cement. The cementitious grout can also include bentonite in an amount of from about 0.1% to about 5% by weight of water in the grout mixture.

The cementitious grout has a ratio of water to cementitious material of from about 0.2:1 to about 1:1 on a weight basis, and preferably from about 0.4:1 to about 0.6:1. The cementitious grout has a ratio of sand to cementitious material of from about 1:1 to about 4:1 on a weight basis, and preferably from about 1.5:1 to about 3:1. The cementitious grout also has a ratio of superplasticizer to cementitious material of from about 0.005:1 to about 0.04 to 1 on a weight basis, preferably from about 0.018:1 to about 0.024:1.

The cementitious grout of the present invention can include additional components, including a thermoplastic air entraining agent, latex, a shrinkage reducing admixture, calcium oxide or combinations thereof The cementitious grout can also include bentonite or cement substitutes, such as blast furnace slag or fly ash.

The cementitious grout, after being wet cured for 28 days, has a thermal conductivity of at least 1.5 W/m.K, and preferably of at least 2.1 W/m.K, and a coefficient of permeability of less than $1.5 \times 10^{-7}$ cm/s at 21° C., and preferably less than $1.6 \times 10^{-10}$ cm/s at 21° C. in the bulk state and $2.8 \times 10^{-7}$ cm/s at 21° C. when bonded to HDPE pipe. The cementitious grout also has a bond strength of at least 10 kPa at 21° C., and preferably of at least 150 kPa at 21° C.

On a weight percentage basis the cementitious grout is made up of from about 15 to about 40 weight percent cement, from about 5 to about 25 weight percent water, from about 40 to about 75 weight percent sand, and from about 0.1 to about 2 weight percent superplasticizer. The cementitious grout can also include from about 0.1 to about 2 weight percent bentonite.

The cementitious grout preferably includes ASTM C 150-Type I cement and silica sand. In a preferred embodiment, the weight percent of cement is from about 25 to about 30 percent and the weight percent of sand is from about 55 to about 60 percent. The preferred superplasticizer is a sulfonated naphthalene, with a 42% solution of sulfonated naphthalene being the most preferred.

The present invention includes a method of filling boreholes used with a geothermal heat pump system which includes the steps of providing a hole in the ground; inserting a U-loop in the hole; contacting the U-loop with the cementitious grout of the present invention which includes cement, water, silica sand and a superplasticizer; and curing the grout. In one embodiment of the present invention the grout is pumped into the borehole and contacts the U-loop under high pressure The cement-sand grouts of the present invention have significantly higher thermal conductivity than the neat cement and bentonite grouts which have previously been used and have a higher retention of thermal conductivity under drying conditions. The increased thermal conductivity results in potential reduction in required bore length for geothermal heat pump systems and, hence, decreased installation costs. The cost savings will vary depending on the bore diameter, the soil type and other variables. In addition, the cement-sand grouts of the present invention provide enhanced bonding to the U-loop, low permeability, low shrinkage, mechanical strength and durability under wet-dry and thermal cycles.

BRIEF DESCRIPTION OF THE FIGURES

Other objects and many attendant features of this invention will be readily appreciated as the invention becomes better understood by reference to the following detailed description when considered in connection with the accompanying drawings wherein.

DETAILED DESCRIPTION OF THE INVENTION

The long-term performance of geothermal heat pumps depends on the reliability of the ground heat exchangers and, consequently, the quality of grouting, dimensional stability and bonding characteristics are critical.

Both bentonite and neat cement grouts have relatively low thermal conductivity. In contrast, the cement-sand grout mixtures of the present invention have higher thermal conductivities due to the high sand content. The present invention provides cement-sand grout as an alternative to bentonites and neat cements. The cement-sand grout formulations of the present invention have improved thermal conductivity while meeting requirements for mixing and pumping with conventional equipment, permeability, shrinkage, bonding to U-loop, durability, ease of handling, and economics.

It has been found that cement-silica sand grouts have thermal conductivities in the range of 2.161 to 2.531 W/m.K (1.249 to 1.463 Btu/hr.ft.° F.) for sand/cement ratios by mass of 2 to 2.5. The silica sand has a high thermal conductivity which results in the cement-sand grouts of the present invention having a significantly higher thermal conductivity than neat cement or bentonite grouts. In addition the cement-sand grouts of the present invention retain conductive properties under drying conditions. It has also been found that bond strength and interfacial impermeability are improved by adding sand to the grout mixture and controlling the water/cement ratio.

The present invention provides cement-sand grouts for backfilling vertical boreholes used with geothermal heat pump (GHP) systems. These grouts reduce the required bore length and improve the performance of GHP systems. The thermally-conductive grouts consist of cement, water, a particular grade of silica sand, superplasticizer and, optionally, a small amount of bentonite.

One embodiment of the present invention has been designed so that it can be easily mixed in the field. This cement-sand grout is formulated by mixing two 100 lb bags of sand and one 94 lb bag of cement, along with 6.2 gallons of water and 1.35 pints of superplasticizer, and optionally, about one pound of bentonite. The thermal conductivity of this cement-sand grout formulation is about 2.42 W/m.K (1.40 Btu/hr.ft.° F.) when wet cured. Slightly lower values are obtained when the grout is cured under sealed conditions. The cement-sand grout of the present invention is approximately three times more conductive than conventional high solids bentonite and neat cement (cement plus water only) grouts, and approximately 1.6 times greater than that for thermally enhanced bentonite. Another benefit of the cement-sand grout is good retention of thermal conductivity under drying conditions. The thermal conductivity value for an oven dried grout showed only a slight decrease to 2.16 W/m.K (1.25 Btu/hr.ft.° F.).

The cement-sand grouts of the present invention provide a balance between required performance properties, economics and compatibility with conventional geotechnical grouting equipment. Moreover, the grouts of the present invention are formulated from materials which are readily available where cement, sand and other masonry supplies are sold. Alternatively, the dry ingredients can be pre-blended and prepackaged so that the user only needs to add water. An analysis of the tests conducted on the grouts of the present invention indicate that bore length can be reduced by 22 to 37% compared with neat cement grout having a thermal conductivity of 0.84 W/m.K. Therefore, in addition to the relatively low material cost, the grouts of the present invention provide significant savings in installation costs due to reduced bore lengths.

While the primary function of the grout is to facilitate heat transfer between the U-loop and surrounding formation, it is also essential that the grout act as an effective borehole sealant. This role is important to prevent leakage of surface contaminants to aquifers or cross contamination between aquifers. The cement-sand grouts of the present invention provide improved interfacial bonding between the grout and U-loop of the GHP system.

The cement-sand grouts of the present invention consist of ASTM C 150-Type I cement, silica sand, water and superplasticizer. In different embodiments, sulphate resistant cements (Types II and V), fly ash (FA) and ground granulated blast furnace slag (BFS) can be used as partial replacements for Type I cement in the grout formulations. These supplementary cementitious materials enhance the durability of the cement-sand grout in adverse environments (e.g., aggressive groundwater), reduce heat of hydration and reduce cost. Cement that already contains a waterproofing additive should not be used because it can cause foaming of the grout and reduce the thermal conductivity. The preferred fly ash conforms to ASTM C 618 Class F. This is a low calcium fly ash produced from combustion of bituminous coal. The preferred blast furnace slag conforms to ASTM C 989 Grade 100.

The preferred silica sand used for the cement-sand grouts of the present invention should conform to ASTM C 33 in terms of soundness and absence of deleterious substances. The particle size gradation shall conform to the size specification in Table 1. The size of the sand particles is important in determining the water to cement ratio and the amount of superplasticizer that is used. A change in the sand particle size requires testing of the grout mixture prior to use to insure that the grout is pumpable and that the grout will cure properly. These tests are well within the skill of a person knowledgeable in the art.

TABLE 1

SPECIFICATION AND SIEVE ANALYSIS OF SAND USED IN THE GROUTS OF THE PRESENT INVENTION

| SIEVE NO. (Size, $\mu$m) | ACI 304, GRADING 1 Percentage Passing (%) | SAND USED Percentage Passing (%) |
| --- | --- | --- |
| 8 (2360) | 100 | 100 |
| 16 (1180) | 95–100 | 98.84 |
| 30 (595) | 55–80 | 66.83 |
| 50 (297) | 30–55 | 52.39 |
| 100 (149) | 10–30 | 10.75 |
| 200 (75) | 0–10 | 0.62 |

The preferred superplasticizer (SP) is a sulfonated naphthalene type with a solids content of 42% by mass and for the experiments conducted herein the superplasticizer was supplied by Master Builders (Rheobuild 1000). This chemical admixture functions as a dispersant and increases grout fluidity. Addition of superplasticizer allows the water/cementitious material ratio (w/c) to be reduced, which results in improved thermal properties, reduced permeability, and increased durability. In one embodiment, calcium oxide is used as an expansive agent to improve bonding to the U-loop.

The grout of the present invention can also include additional materials to provide different properties. The addition of small amounts of bentonite (2-5% by mass of water) to the cement-sand grout mixture reduces bleeding, promotes full volume set and improves the sand carrying capacity (i.e., reduced settling). The preferred bentonite is 200-mesh Wyoming bentonite (sodium montmorllonite). The viscosity of the grout increases as the proportion of bentonite is increased.

The water that is used should be potable. Water with excessive impurities may affect the final properties of the grout. The use of water containing a high concentration of organic or inorganic impurities should be avoided, since the impurities may not be compatible with the additives that are used and may affect the curing of the grout.

Thermoplastic air entraining agents that are commonly used in concrete can be used to improve the freeze-thaw durability of the grout in one embodiment of the present invention. The air entraining agent (preferably VINSOL™) is added at a rate of from about 0.3 to about 5 ml/kg cement.

When thermoplastic pipe is used, the addition of latex to the grout mixture improves the bonding between the cement-sand grout and the pipe. The preferred latex is a styrene butadiene copolymer (TYLAC™ 68014-00, Reichold Chemicals) with a polymer solids content of 42%. The polymer solids/cement ratio (p/c) is from about 0.01 to about 0.25, and preferably from about 0.05 to about 0.15. Latex has a tendency to foam when added to the cement-sand grout mixture. Foaming is reduced by gradually adding the latex to the grout mixture and slowly mixing them together. Foaming can also be reduced by the addition of a silicone anti-foam, such as D-Air2 (Halliburton).

A shrinkage reducing admixture, such as ECLIPSE™ by W. R.Grace, which is frequently used in concrete, can be added to the grout mixture to decrease shrinkage caused by drying. The admixture alters the surface tension of the water in the grout mixture when added in an amount of from about 1–5% by mass of the cement, preferably about 2–3%. The admixture decreases the amount of water that has to be mixed with the grout, and also increases the fluidity of the grout so that the amount of superplasticizer added to the grout mixture can be decreased. Lime (CaO) can be added to the grout mixture to act as an expansive agent. Lime is added in an amount of from 2–10% by mass of the cement, preferably about 5–7%. The lime expands when contacted with water and acts to counter the effect of shrinkage when the cement-sand grout cures.

The compositions of the cement-sand grouts tested are listed below in Table 2. The cement used was a ASTM C 150

Type I cement. In Mix Nos. 109 and 112, Blast Furnace Slag (conforming to ASTM C989, Grade 100) was used as a partial replacement for Type I cement and in Mix No. 110 Fly Ash (conforming to ASTM C618, Class F) was used as a partial replacement for Type I cement. The silica sand conformed to the sieve analysis in Table 1. The superplasticizer was a sulfonated naphthalene type with a solids content of 42% by mass, produced by Master Builders Technologies (Rheobuild 1000).

TABLE 2

MIX PROPORTIONS OF CEMENT-SAND GROUTS OF THE PRESENT INVENTION

| COMPONENTS | MIX NO. | | | | | | | |
|---|---|---|---|---|---|---|---|---|
| | 108 | 109 | 110 | 111 | 112 | 111 0.05 L | 111 0.1 L | 111 0.15 L |
| Cement (kg/m³) | 530 | 315 | 312 | 590 | 470 | 580 | 570 | 557 |
| Blast Furnace Slag (kg/m³) | 0 | 210 | 0 | 0 | 118 | 0 | 0 | 0 |
| Fly Ash (kg/m³) | 0 | 0 | 208 | 0 | 0 | 0 | 0 | 0 |
| Water (l/m³) | 318 | 315 | 312 | 324.5 | 323.4 | 287.5 | 251.6 | 215.8 |
| Sand (kg/m³) | 1325 | 1313 | 1300 | 1257 | 1252 | 1235 | 1214 | 1187 |
| Bentonite (kg/m³) | 0 | 0 | 0 | 6 | 0 | 0 | 0 | 0 |
| Superplasticizer (l/m³) | 5.3 | 5.25 | 5.2 | 8.8 | 8.8 | 5.8 | 5.7 | 5.6 |
| Latex (kg/m) | 0 | 0 | 0 | 0 | 0 | 60.4 | 118.6 | 173.9 |
| Specific Gravity | 2.18 | 2.16 | 2.14 | 2.18 | 2.17 | 2.17 | 2.16 | 2.14 |

Mix No. 111 is a preferred cement-sand grout mixture for the present invention and it has a sand/cementitious ratio corresponding to two 100 lb bags of sand added for one 94 lb bag of cement. Table 3 shows the formulation of Mix No. 111.

TABLE 3

FORMULATION OF CEMENT-SAND GROUT MIX NO. 111

| COMPONENT | AMOUNT |
|---|---|
| Cement | 1 × 94 lb bag |
| Water | 23.5 liters (6.19 U.S. gallons) |
| Sand | 2 × 100 lb bags |
| Superplasticizer | 639 ml (1.35 pints) |
| Bentonite (optional) | 470 g |
| Yield | 72.2 liters (19.1 U.S. gallons) |

Table 4 shows the formulations of three neat cement grouts with different water to cement ratios. The neat cement grouts do not contain sand and were tested as a basis for evaluating the results of the tests performed on the cement-sand grouts of the present invention.

TABLE 4

MIX PROPORTIONS OF NEAT CEMENT GROUTS

| COMPONENTS | MIX NO. | | |
|---|---|---|---|
| | 47 (0.4) | 47 (0.6) | 47 (0.8) |
| Cement (kg/m³) | 1369 | 1087 | 894 |
| Water (l/m³) | 547.6 | 652.2 | 715.2 |
| Water to Cement (w/c) ratio | 0.4 | 0.6 | 0.8 |
| Superplasticizer (l/m³) | 27.4 | 0 | 0 |
| Specific Gravity | 1.95 | 1.74 | 1.61 |

Thermal Conductivity

EXAMPLE 1

To measure the thermal conductivity, the cementitious grouts were cast as blocks 75 mm×125 mm×25 mm. Three specimens per batch were cast. The blocks were sealed to prevent evaporation, demoulded after 24 hours and placed in a water bath to cure. The hardened grouts were tested for thermal conductivity at an age of 14 days. The grouts were then dried in an oven at 40° C. over a period of seven days, allowed to cool and re-tested to determine the effect of loss of moisture. In addition, the effect of curing conditions on thermal conductivity of Mix 111 was determined. Some specimens were placed in a sealed container after demoulding rather than in a water bath.

Thermal conductivity was measured using a Shotherm QTM-D2 Thermal Conductivity Meter. This meter uses the hot wire method to calculate the thermal conductivity, λ. Equation I is the basic expression for measurement of λ by this method. The hot wire test is a transient method and, therefore, overcomes the problem of moisture migration and subsequent decrease in thermal conductivity of moist grouts that would occur with a steady state method. A probe consisting of a heater and thermocouple on the surface of a sole plate with known thermal conductivity is placed on the surface of the material to be tested. Constant current is passed through the heater wire and the electromotive force of the thermocouple at the time is automatically recorded. The thermal conductivity is obtained from Equation 2. Three measurements per specimen were made. Thus, the total number of measurements per grout formulation was nine.

$$\lambda = \frac{q\ln(t_2/t_1)}{4\pi(T_2 - T_1)} \quad (1)$$

where
  λ=thermal conductivity (W/m.K)
  q=rate of heat flow per unit length (W/m)
  $t_1$=time I (s)
  $t_2$=time 2 (s)
  $T_1$=temperature at $t_1$ (K)
  $T_2$=temperature at $t_2$ (K)

$$\lambda = \frac{KI^2\ln(t_2/t_1)}{V_2 - V_1} - H \quad (2)$$

where:
  I=current (A)
  K and H =constants
  $V_1$=electromotive force of thermocouple at $t_1$ (mV)

$V_2$=electromotive force of thermocouple at $t_2$ (mV)

The average thermal conductivity of the three cement-sand grout specimens of the present invention in the wet and dry states are presented in Table 5. Also shown are the average values obtained for three cement-sand grout formulations of the present invention modified with an air entraining agent and three cement-sand grout formulations of the present invention modified with latex. As a basis for comparison, a commercially available grout that contains sand (Conbextra S, Fosroc) was also tested and the average thermal conductivity values for three samples is shown. All of the grouts were wet cured for 14 days prior to testing. The latex-modified grout was wet cured for two days and then allowed to dry in the ambient air for 12 days. The specimens were then vacuum saturated before measuring thermal conductivity.

TABLE 5

THERMAL CONDUCTIVITIES OF CEMENT-SAND GROUT MIXTURES OF THE PRESENT INVENTION AND A COMMERCIALLY AVAILABLE GROUT

| GROUT MIX | THERMAL CONDUCTIVITY, W/m.K 14 Days | THERMAL CONDUCTIVITY, W/m.K After Drying |
|---|---|---|
| 111 | 2.423 ± 0.045 | 2.160 ± 0.038 |
| 111 + Air Entraining Agent | 1.753 ± 0.029 | 1.552 ± 0.030 |
| 111 + Latex | 2.276 ± 0.045 | 2.196 ± 0.039 |
| Conbextra S | 1.771 ± 0.034 | 1.613 ± 0.032 |

Table 5 shows that Mix No. 111, a preferred cement-sand grout formulation, has a relatively high thermal conductivity in both the moist and dry states. The average thermal conductivity value of 2.423 W/m.K for Mix No. 111 is significantly higher than the thermal conductivity values of other grouts that have previously been used for GHP systems. A comparison of the thermal conductivity values of Mix No. 111 and other grouts are shown below in Table 6.

TABLE 6

THERMAL CONDUCTIVITIES OF DIFFERENT GROUTS

| GROUT | THERMAL CONDUCTIVITY W/m.K |
|---|---|
| Mix No. 111 | 2.423 |
| Neat Cement Grout | 0.803 to 0.868 |
| High Solids Bentonite | 0.75 to 0.80 |
| Thermally Enhanced Bentonite | 1.46 |

The thermal conductivity of the preferred formulation can vary as the component mix is changed within the ranges covered by the present invention. The cement to sand ratio of the grouts can be adjusted to a higher percentage of sand to increase the thermal conductivity of the grout. Additives can be added to the grout to enhance different properties but in most cases the additive decreases the thermal conductivity because it lowers the concentration of sand in the grout mixture.

Wet grout mixtures have a higher thermal conductivity than dry mixtures. As a wet grout begins to dry, moisture is lost and the thermal conductivity decreases. When selecting the grout formulation, it is important that the grout provides a high thermal conductivity when the grout is wet, as well as when the grout is dry. The decrease in conductivity resulting from drying is reversible on resaturation of the grout. As the amount of water in the surrounding ground changes, the saturation level of the grout will change. Therefore, it is desirable for the grout formulation to maintain a high thermal conductivity under different saturation conditions so that the efficiency of the GHP system is not affected as the amount of moisture in the surrounding ground changes.

Coefficient of Permeability

EXAMPLE 2

The water coefficient of permeability (hydraulic conductivity) of the various cement-sand grout formulations of the present invention under saturated conditions was measured in a flexible wall triaxial cell permeameter on cylindrical specimens 102 mm in diameter and 70 mm long. The permeant was de-aired tap water at room temperature. The applied pressure gradient was 207 kPa (30 psi) over the length of the specimen. The confining pressure applied to seal a latex membrane to the side surface of the grout specimen was 414 kPa (60 psi). The experimental set-up followed that given in ASTM D 5084-90. The results from these permeability tests for cement-sand grouts of the present invention are listed in Table 7.

TABLE 7

COEFFICIENT OF PERMEABILITY FOR GROUT FORMULATIONS OF THE PRESENT INVENTION

| GROUT MIX | PERMEABILITY (cm/s) |
|---|---|
| 108 | $5.1 \times 10^{-10} \pm 1 \times 10^{-10}$ |
| 109 | $4.9 \times 10^{-10} \pm 7 \times 10^{-11}$ |
| 110 | $5.8 \times 10^{-10} \pm 9 \times 10^{-11}$ |
| 111 | $1.58 \times 10^{-10} \pm 5.2 \times 10^{-11}$ |

EXAMPLE 3

In order to compare the hydraulic sealing capability of the cement-sand grouts of the present invention with cementitious grouts used in the prior art, tests were conducted with neat cement grouts. The neat cement grouts were tested at different water to cement ratios and different temperatures to determine how changes to the water to cement ratio and temperature affects the permeability of the neat cement grouts. The results are shown in Table 8.

TABLE 8

COEFFICIENT OF PERMEABILITY OF NEAT CEMENT GROUT-PIPE SPECIMENS AT DIFFERENT TEMPERATURES

| GROUT MIX water/cement ratio | TEMPERATURE (° C.) | PERMEABILITY (cm/s) |
|---|---|---|
| 0.4 | 1 | $4.87 \times 10^{-5} \pm 3.1 \times 10^{-6}$ |
| 0.4 | 21 | $6.30 \times 10^{-6} \pm 2.5 \times 10^{-7}$ |
| 0.4 | 30 | $2.68 \times 10^{-6} \pm 4.3 \times 10^{-7}$ |
| 0.6 | 1 | $5.10 \times 10^{-5} \pm 5.6 \times 10^{-6}$ |
| 0.6 | 21 | $7.48 \times 10^{-6} \pm 9.0 \times 10^{-7}$ |
| 0.6 | 30 | $2.37 \times 10^{-6} \pm 3.2 \times 10^{-7}$ |
| 0.8 | 1 | $8.40 \times 10^{-5} \pm 9.8 \times 10^{-6}$ |
| 0.8 | 21 | $1.06 \times 10^{-5} \pm 1.2 \times 10^{-6}$ |
| 0.8 | 30 | $5.87 \times 10^{-6} \pm 6.3 \times 10^{-7}$ |

Figure 1:
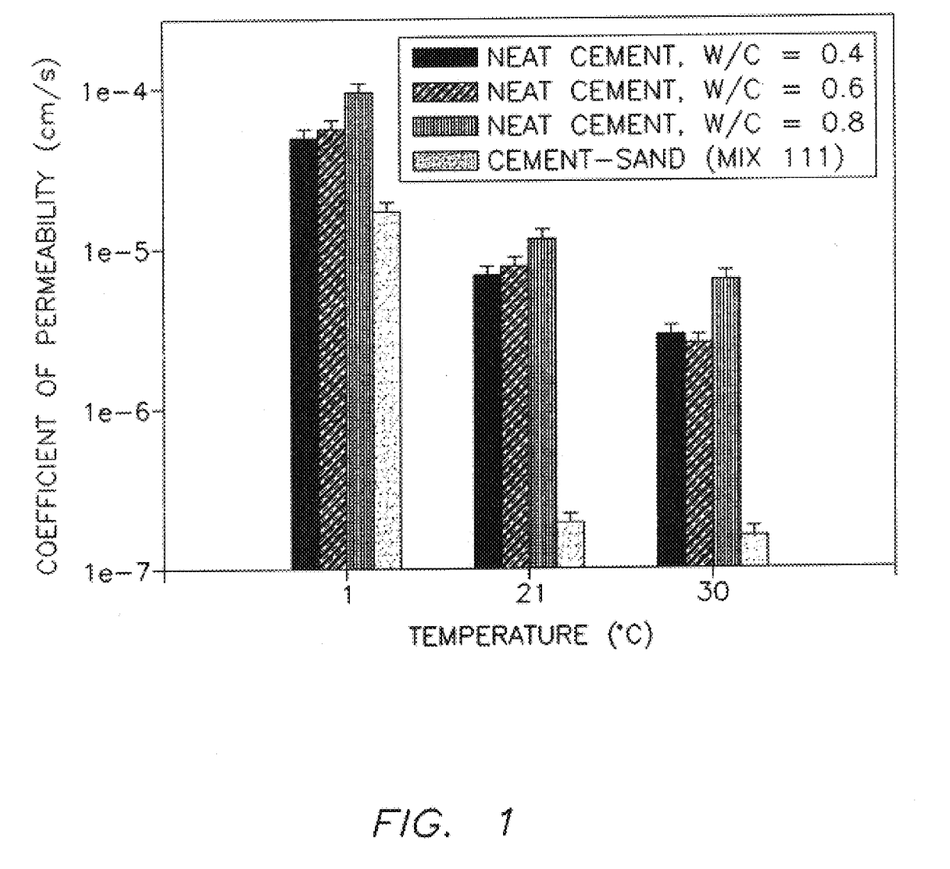
FIG. 1 is a bar graph which compares the coefficient of permeability of a preferred cement-sand grout formulation of the present invention with neat cements having different water to cement ratios.

The results of the permeability tests for the cement-sand grouts of the present invention and the neat cement grouts, when bonded to HDPE pipes, are shown in graphical form in FIG. 1. The graph shows that over a temperature range of from 1° C. to 30° C., the cement-sand grouts of the present invention are less permeable and have superior sealing characteristics than neat cement grouts. The difference in permeabilities of the grout/pipe specimens increased as the temperature increased and the greatest difference in permeability was measured at 30° C.

EXAMPLE 4

Mix No. 111 is one of the preferred cement-sand grouts of the present invention and its permeability, when bonded to HDPE pipes, was measured over a temperature range of from 1° C. to 350C and compared to a commercially available grout (Conbextra S) measured at 21° C. The results from these tests are listed in Table 9. These tests show that Mix No. 111 had a substantially lower system permeability than Conbextra S at 21° C.

TABLE 9

COEFFICIENT OF PERMEABILITY OF PREFERRED FORMULATION GROUT-PIPE SPECIMENS AT DIFFERENT TEMPERATURES AND A COMMERCIALLY AVAILABLE GROUT-PIPE SPECIMEN

| GROUT MIX | TEMPERATURE (° C.) | PERMEABILITY (cm/s) |
|---|---|---|
| 111 | 1 | $1.57 \times 10^{-5} \pm 2.5 \times 10^{-6}$ |
| 111 | 21 | $1.93 \times 10^{-7} \pm 2.1 \times 10^{-8}$ |
| 111 | 30 | $1.58 \times 10^{-7} \pm 2.0 \times 10^{-8}$ |
| 111 | 35 | $5.37 \times 10^{-8} \pm 4.7 \times 10^{-9}$ |
| Conbextra S | 21 | $2.89 \times 10^{-6} \pm 4.1 \times 10^{-7}$ |
| Conbextra S | 30 | $1.22 \times 10^{-7} \pm 3.6 \times 10^{-6}$ |

EXAMPLE 5

Latex was added to a preferred cement-sand grout formulation (Mix No. 111) in varying amounts of 5, 10 and 15 weight percent of polymer solids to cement in the formulation. The specimens formed from these formulations were cast around HDPE pipes and tested for permeability. The results are presented in Table 10. The test results in Table 10 show that the permeability of the grout/pipe specimens decreases as the amount of latex added to the cement-sand grouts increases.

TABLE 10

COEFFICIENT OF PERMEABILITY OF LATEX-MODIFIED GROUT-PIPE SPECIMENS AT DIFFERENT TEMPERATURES

| GROUT MIX | TEMPERATURE (° C.) | PERMEABILITY (cm/s) |
|---|---|---|
| 111 0.05 L | 21 | $6.37 \times 10^{-7} \pm 8.2 \times 10^{-8}$ |
| 111 0.10 L | 21 | $5.84 \times 10^{-7} \pm 7.8 \times 10^{-8}$ |
| 111 0.15 L | 1 | $4.03 \times 10^{-5} \pm 5.9 \times 10^{-6}$ |
| 111 0.15 L | 21 | $2.80 \times 10^{-7} \pm 4.5 \times 10^{-8}$ |

EXAMPLE 6

The effect of thermal cycles on permeability of cement-sand and neat cement grout/pipe specimens was investigated. Three grout/pipe specimens per mix were tested. The grout/pipe specimens were first tested for permeability at room temperature (21° C.). Subsequently, the specimens were conditioned in a water bath for 24 hours at 30° C. and re-tested. The specimens were then conditioned for 24 hours in water kept in a refrigerator at 1° C. and re-tested. Following this, the specimens were subjected to 14 cycles alternating between 30° C. and 1° C. The duration of each cycle was one day. The final measurement was taken at room temperature.

The average initial and final permeabilities for the grout/pipe specimens tested are listed in Table 11. The results show that the thermal cycles resulted in only a small increase in the permeability of the specimens. The neat cement grout/pipe specimens cracked and, therefore, were not tested. After the thermal cycles, the grout/pipe specimens of the present invention still had a lower permeability than neat cement grouts and the Conbextra S grout.

TABLE 11

PERMEABILITIES OF GROUT/PIPE SPECIMENS AFTER THERMAL CYCLES

| INITIAL PERMEABILITY (cm/s) | FINAL PERMEABILITY (cm/s) |
|---|---|
| $1.93 \times 10^{-7} \pm 2.1 \times 10^{-8}$ | $3.41 \times 10^{-7} \pm 3.9 \times 10^{-8}$ |

EXAMPLE 7

Three grout/pipe specimens per mix were measured for permeability, subjected to wet-dry cycles and re-measured for permeability. The specimens were first tested after 28 days of wet curing. The specimens then underwent 14 wet-dry cycles. These cycles consisted of immersion in water at room temperature for five hours followed by drying in air at room temperature and relative humidity 40–50% for 43 hours.

The average initial and final permeabilities for the three cement-sand grout/pipe specimens that were tested are listed in Table 12. Again, the neat cement grout/pipe specimens cracked and were not tested. The results show that the wet-dry cycles resulted in only a small increase in the permeability of the specimens and that the specimens still had a lower permeability than neat cement grouts (see Table 8) and the Conbextra S grout (see Table 9).

TABLE 12

PERMEABILITIES OF GROUT/PIPE SPECIMENS AFTER WET-DRY CYCLES

| INITIAL PERMEABILITY (cm/s) | FINAL PERMEABILITY (cm/s) |
|---|---|
| $2.76 \times 10^{-7} \pm 3.4 \times 10^{-8}$ | $4.44 \times 10^{-7} \pm 3.9 \times 10^{-8}$ |

Bond Strength

EXAMPLE 8

The relative bond strengths of selected grouts to HDPE (i.e., high density polyethylene) were measured by push out tests. For these tests, an annulus of grout was cast around an axial length of 1 in. ID (1.3 in. OD) HDPE Driscopipe® 5300 (Phillips 66). The diameter of the specimens was 102 mm and the length was 104 mm. The pipe projected out of the grout approximately 5 mm. Specimens were insulated after casting for a period of 28 hours. After the initial 28 hour period the grout-pipe specimens were demoulded and placed in a water bath for 28 days. Six specimens per grout batch were tested in a Geotest compression tester. Movement of the pipe was monitored with a dial gauge and LVDT (linear variable differential transducer). The load required to push the pipe out 0.04 in. (1 mm) was recorded. Bond strength was calculated by dividing the load by the surface area of the embedded pipe. In addition to the cement-sand grout mixes of the present invention, the bond strengths of three specimens containing lime as an expansive agent were compared with the bond strength for identical grout formulations without lime. The specimens were wet cured before the bond strengths were measured.

TABLE 13

BOND STRENGTHS OF GROUT MIXES
AT ROOM TEMPERATURE (≈21° C.)

| GROUT MIX NO. | BOND STRENGTH (kPa) |
|---|---|
| 47(0.4) | 3.6 ± 0.7 |
| 108 | 72.4 ± 12.9 |
| 109 | 73.0 ± 10.3 |
| 110 | 47.0 ± 10.8 |
| 111 | 150 ± 20.5 |
| 111 + CaO | 69.5 ± 13.4 | where: CaO is calcium oxide (or "quicklime")

Figure 2:
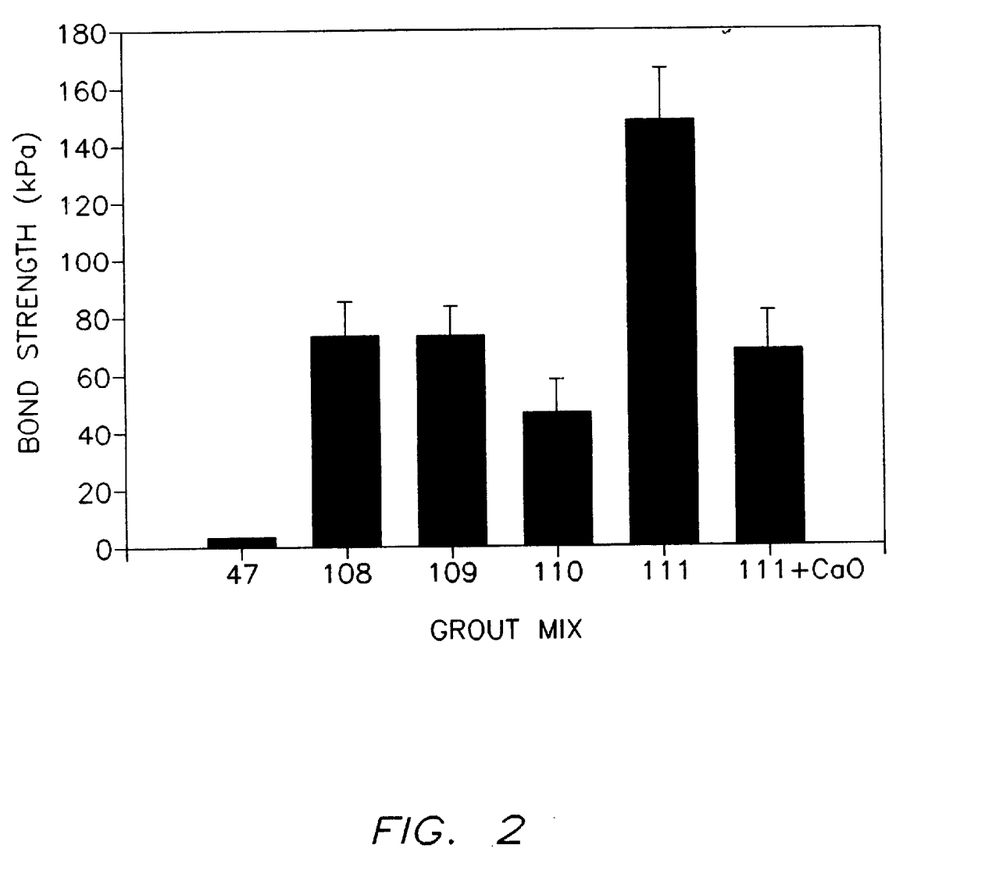
FIG. 2 is a bar graph which compares the bond strengths of different cement-sand grout mixes of the present invention and a neat cement grout.

The results of the bond strength tests at room temperature from Table 13 are displayed as a bar graph in FIG. 2. The results show that the cement-sand grouts of the present invention (Mix Nos. 108, 109, 110, 111 and 111+CaO) have superior bonding characteristics when compared to neat cement (Mix No. 47 (0.4)). This is due to the higher shrinkage and higher exotherm of neat cement grouts. Mix 111 had the highest bond strength of the different cement-sand grout formulations and this can be attributed to a lower water/cement ratio. The cement-sand grout mix containing calcium oxide (Mix No. 111+CaO) had a lower bond strength than the same mix without calcium oxide (Mix No. 111). It is believed that this was caused by the rapid hydration of the lime, which consumed a large portion of the water before the water could react with the cement. Therefore, it was determined that when calcium oxide is used as an additive, additional water must be added to the grout mixture.

EXAMPLE 9

The effect of temperature on bond strength was investigated by conditioning three specimens in water at temperatures of 1, 21 and 35° C. The specimens were submerged in the water bath for 24 hours before the bond strengths were measured. The results of the tests are shown below in Table 14.

TABLE 14

EFFECT OF TEMPERATURE ON BOND STRENGTH
FOR CEMENT-SAND GROUT MIX 111

| TEMPERATURE (° C.) | BOND STRENGTH (kPa) |
|---|---|
| 1 | 20.0 ± 1.4 |
| 21 | 150 ± 20.5 |
| 35 | 329 ± 39.0 |

Figure 3:
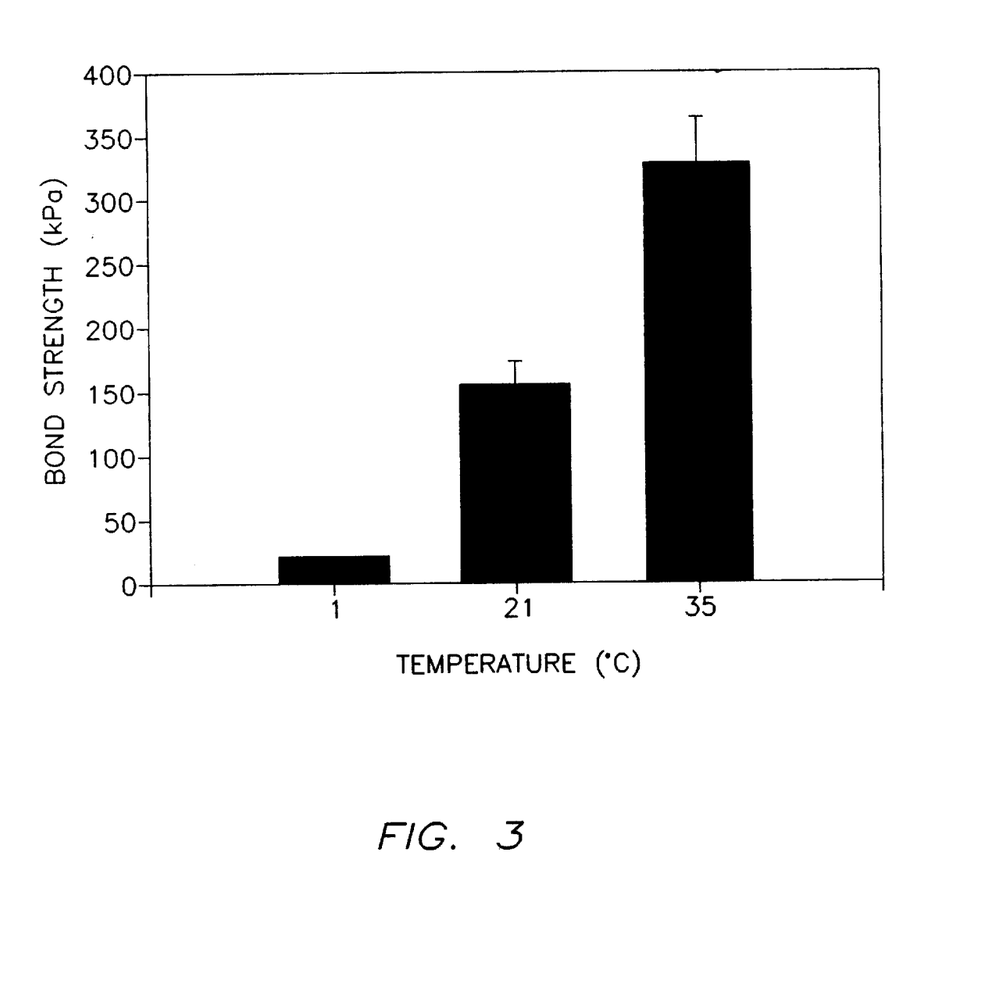
FIG. 3 is a bar graph which compares the bond strengths of a preferred cement-sand grout formulation of the present invention at different temperatures.

The test results from Table 14 are shown in FIG. 3 as a bar graph of bonding strength versus temperature for Mix 111. The graph shows that the bond strength decreases as the temperature decreases. The change in the bond strength can be attributed in part to the contraction and expansion of the HDPE pipe. At low temperatures, the bond strength decreased due to the contraction of the pipe; while at elevated temperatures, the bond strength increased as the pipe expanded.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

What is claimed is:

1. A cementitious grout comprising:
   a cement;
   a silica sand in a ratio of from 1:1 to about 4:1 on a weight basis to the cement;
   a sulfonated naphthalene superplasticizer in a ratio of from about 0.0005:1 to about 0.03:1 on a weight basis to the cement and sand; and
   water in a ratio of from about 0.2:1 to about 2:1 on a weight basis to the sand and cement.

2. The cementitious grout according to claim 1, further comprising bentonite in an amount of from about 0.5% to about 5% by weight of water.

3. The cementitious grout according to claim 1, further comprising a component selected from the group consisting of a thermoplastic air entraining agent, latex, a shrinkage reducing admixture, calcium oxide and combinations thereof, wherein the thermoplastic air entraining agent is from about 0.3 to about 5 ml/kg cement, the latex/cement ratio is from about 0.01 to about 0.25, the shrinkage reducing admixture is from about 1–5% by mass of the cement and the calcium oxide is from 2–10% by mass of the cement.

4. The cementitious grout according to claim 1, wherein said cementitious grout has a thermal conductivity of at least 1.5 W/m.K.

5. The cementitious grout according to claim 1, wherein said cementitious grout has a coefficient of permeability of less than $1.5 \times 10^{-7}$ cm/s at 21° C.

6. The cementitious grout according to claim 1, wherein said cementitious grout has a bond strength of at least 10 kPa at 21° C.

7. The cementitious grout according to claim 1, further comprising an additional component of bentonite, wherein the bentonite is from about 2–5% by mass of water.

8. A cementitious grout comprising:
   from about 15 to about 40 weight percent cement;
   from about 5 to about 25 weight percent water;
   from about 40 to about 75 weight percent sand; and
   from about 0.1 to about 2 weight percent sulfonated naphthalene superplasticizer.

9. The cementitious grout of claim 8, further comprising from about 0.1 to about 2 weight percent bentonite.

10. The cementitious grout according to claim 8, wherein said cement is ASTM C 150-Type I cement and said sand is silica sand conforming to ASTM C 33.

11. The cementitious grout according to claim 8, wherein said weight percent of cement is from about 25 to about 30 percent and said weight percent of sand is from about 55 to about 60 percent.

12. The cementitious grout according to claim 8, further comprising an additional component of bentonite.

13. The cementitious grout according to claim 8, wherein said cementitious grout has a thermal conductivity of at least 1.5 W/m.K.

14. The cementitious grout according to claim 8, wherein said cementitious grout has a coefficient of permeability of less than $1.5 \times 10^{-7}$ cm/s at 21° C.

15. The cementitious grout according to claim 8, wherein said cementitious grout has a bond strength of at least 10 kPa at 21° C.

16. The cementitious grout according to claim 8, further comprising a component selected from the group consisting of a thermoplastic air entraining agent, latex, a shrinkage reducing admixture, calcium oxide and combinations thereof, wherein the thermoplastic air entraining agent is from about 0.3 to about 5 ml/kg cement, the latex/cement ratio is from about 0.01 to about 0.25, the shrinkage reducing admixture is from about 1–5% by mass of the cement and the calcium oxide is from 2–10%/o by mass of the cement.

17. A method of filling boreholes used with a geothermal heat pump system comprising the steps of:
  providing a hole in the ground;
  inserting a U-loop in said hole;
  contacting said U-loop with a cementitious grout comprising a cement, water, a silica sand and a superplasticizer; and
  curing said grout.

18. The method of filling boreholes according to claim 17, wherein said cementitious grout has a thermal conductivity of at least 1.5 W/m.K.

19. The method of filling boreholes according to claim 17, wherein said cementitious grout has a coefficient of permeability of less than $1.5 \times 10^{-7}$ cm/s at 21° C.

20. The method of filling boreholes according to claim 17, wherein said cementitious grout has a bond strength of at least 10 kPa at 21° C.

21. The method of filling boreholes according to claim 18, wherein said cementitious grout further comprises an additional component of bentonite, wherein the bentonite is from about 2–5% by mass of water.

22. The method of filling boreholes according to claim 17, wherein said cementitious grout further comprises a component selected from the group consisting of a thermoplastic air entraining agent, latex, a shrinkage reducing admixture, calcium oxide and combinations thereof, wherein the thermoplastic air entraining agent is from about 0.3 to about 5 ml/kg cement, the latex/cement ratio is from about 0.01 to about 0.25, the shrinkage reducing admixture is from about 1–5% by mass of the cement and the calcium oxide is from 2–10% by of the cement.

23. The method of filling boreholes according to claim 17, wherein said cementitious grout further comprises bentonite.

24. The method of filling boreholes according to claim 17, wherein said cement is ASTM C 150-Type I cement and wherein said cementitious grout further comprises bentonite.

25. The method of filling boreholes according to claim 17, wherein said grout contacts said U-loop under high pressure.

* * * * *